United States Patent [19]

English

[11] Patent Number: 4,629,092
[45] Date of Patent: Dec. 16, 1986

[54] COFFEE FILTER DISPENSER

[76] Inventor: Franklin W. English, Rte. 1, Box 403, Ben Wheeler, Tex. 75754

[21] Appl. No.: 652,069

[22] Filed: Sep. 19, 1984

[51] Int. Cl.$^4$ .............................................. B65G 59/00
[52] U.S. Cl. ..................................... 221/247; 221/259
[58] Field of Search ................ 221/37, 259, 216, 210, 221/214, 215, 261, 276, 36, 40, 41, 247, 248, 249; 271/139, 19

[56] References Cited

U.S. PATENT DOCUMENTS

| | | |
|---|---|---|
| 930,619 | 8/1909 | Russell . |
| 1,857,074 | 5/1932 | Wright et al. . |
| 2,369,955 | 2/1945 | Eastman . |
| 2,457,758 | 12/1948 | Vore . |
| 2,568,413 | 9/1951 | Rubisch . |
| 2,639,959 | 5/1953 | Couden . |
| 2,713,486 | 7/1955 | Aydlett . |
| 2,896,820 | 7/1959 | Clark et al. . |
| 3,133,672 | 5/1964 | Thomasma et al. . |
| 3,152,722 | 10/1964 | Thomasma et al. . |
| 3,208,635 | 9/1965 | Saxe ...................................... 221/36 |
| 3,300,085 | 1/1967 | Simor . |
| 3,705,665 | 12/1972 | Gunzler . |
| 3,871,641 | 3/1975 | Marx et al. . |
| 4,071,165 | 1/1978 | Leopoldi . |
| 4,093,297 | 6/1978 | Reiber ................................. 294/99.1 |
| 4,121,726 | 10/1978 | Pemberton ............................ 221/37 |
| 4,214,673 | 7/1980 | Heath et al. ......................... 221/259 |
| 4,269,324 | 5/1981 | Hausam . |

FOREIGN PATENT DOCUMENTS

| | | |
|---|---|---|
| 1034011 | 7/1958 | Fed. Rep. of Germany . |
| 1092107 | 11/1954 | France ................................. 221/41 |
| 922969 | 4/1963 | United Kingdom . |

OTHER PUBLICATIONS

Mr. Coffee Filter Package—Order Form "Mr. Pick Filter Picker".

Primary Examiner—H. Grant Skaggs
Assistant Examiner—Gregory L. Huson

[57] ABSTRACT

There is provided a coffee filter dispenser which is easily reset after dispensing a single coffee filter into a position for dispensing the next successive coffee filter, from a nested stack of coffee filters secured within an enclosed container.

4 Claims, 3 Drawing Figures

COFFEE FILTER DISPENSER

BACKGROUND OF THE INVENTION

This invention is a coffee filter dispenser for singularly dispensing cupuliform coffee filters from a nested stack of coffee filters secured within an enclosed container. One such coffee filter must be used for each pot of coffee brewed in an automatic drip coffee machine. Automatic drip coffee machines are very popular both for domestic and commercial use and separating one filter for use from a stack of filters is often a difficult task because the coffee filters are packaged in stacks which tend to stick together. Further, there are sanitary objections for repeated and excessive handling the entire stack each time a single filter is needed, particularly in commercial settings. An apparatus for conveniently and effectively separating a single filter from a stack should be dependable, simple, easy to use, and inexpensive.

SUMMARY OF THE INVENTION

It is therefore an object of the present invention to provide a coffee filter dispenser for singularly dispensing cupuliform coffee filters from a nested stack of coffee filters secured within an enclosed container.

It is another object of the present invention to provide a coffee filter dispenser in which a single operation, that of opening a hinged lid, serves to present a single, separated coffee filter to the exterior of a container in which a plurality of nested filters are enclosed.

It is a further object of the present invention to provide a coffee filter dispenser which is easily reset for dispensing the next successive coffee filter from a nested stack secured within an enclosed container.

Toward the fulfillment of these and other objects, according to the coffee filter dispenser of the present invention, a container having a plurality of walls which define an opening is disposed in such a manner as to receive a stack of cupuliform coffee filters in which the planar bottom of the nested stack of filters is directed opposite the opening and in which the stack of coffee filters comes adjacent a first one of said walls. A lid is hingedly connected to the container to cover the opening and a plunger arm is pivotly connected to the underside of the lid to project into the container and into the nested stack of cupuliform coffee filters. The end of the plunger arm forms a filter engaging projection and the pivotal connection of the plunger arm is such that the freedom of the plunger arm to pivot is in a plane substantially orthogonal to the first wall. Means are provided for automatically urging the filter engaging projection of the plunger arm toward the first wall, thereby engaging the upper most of the coffee filters in a frictional engagement pressing the filters between the filter engaging projection and the first wall. Lifting the lid raises the plunger arm and draws the uppermost coffee filter away from the rest of the stack. The separated coffee filter is dispensed through the opening and means are provided for withdrawing the plunger arm from the extended position toward which the plunger arm is urged for engaging the coffee filter on the upstroke of the lid. Thus the plunger retreats on the downstroke of the lid to a position which permits closure of the lid and replacement of the plunger arm within the nested stack of cupuliform coffee filters within the container in position for singularly dispensing the next successive uppermost coffee filter.

A BRIEF DESCRIPTION OF THE DRAWINGS

The above brief description, as well as further objects, features, and advantages of the present invention will be more fully appreciated by reference to the following detailed description of the presently preferred, but nonetheless illustrative embodiment in accordance with the present invention when taken in conjunction with the accompanying drawings in which.

A DETAILED DESCRIPTION OF THE PREFERRED EMBODIMENT

Figure 1:
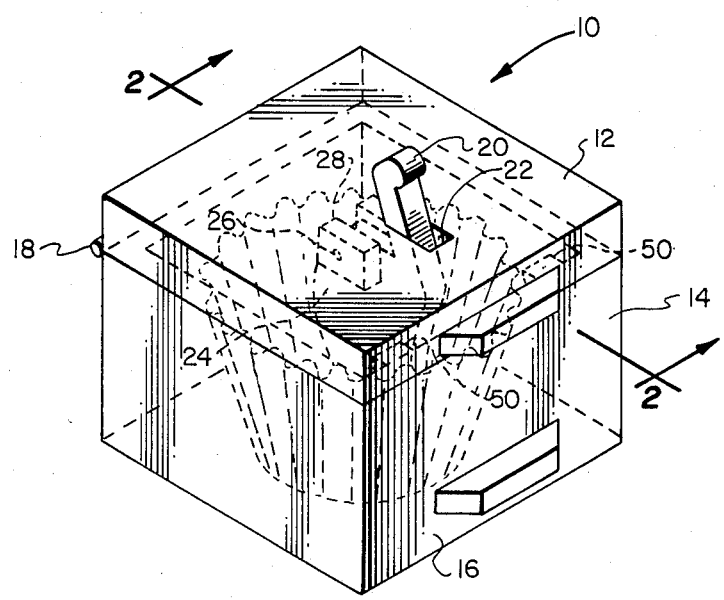
FIG. 1 is a perspective view of a coffee filter dispenser constructed in accordance with the present invention.

Referring to FIG. 1 of the drawings, the reference numeral 10 refers generally to a coffee filter dispenser of the present invention. The exterior of coffee filter dispenser 10 includes a lid 12, a container 14 having a plurality of walls 16 and a hinge 18 connecting lid 12 to container 14.

In the embodiment of FIG. 1, a reset actuator 20 projects through an aperture 22 in lid 12 to provide access for manipulating a plunger arm 24 on the interior of container 14.

Figure 2:
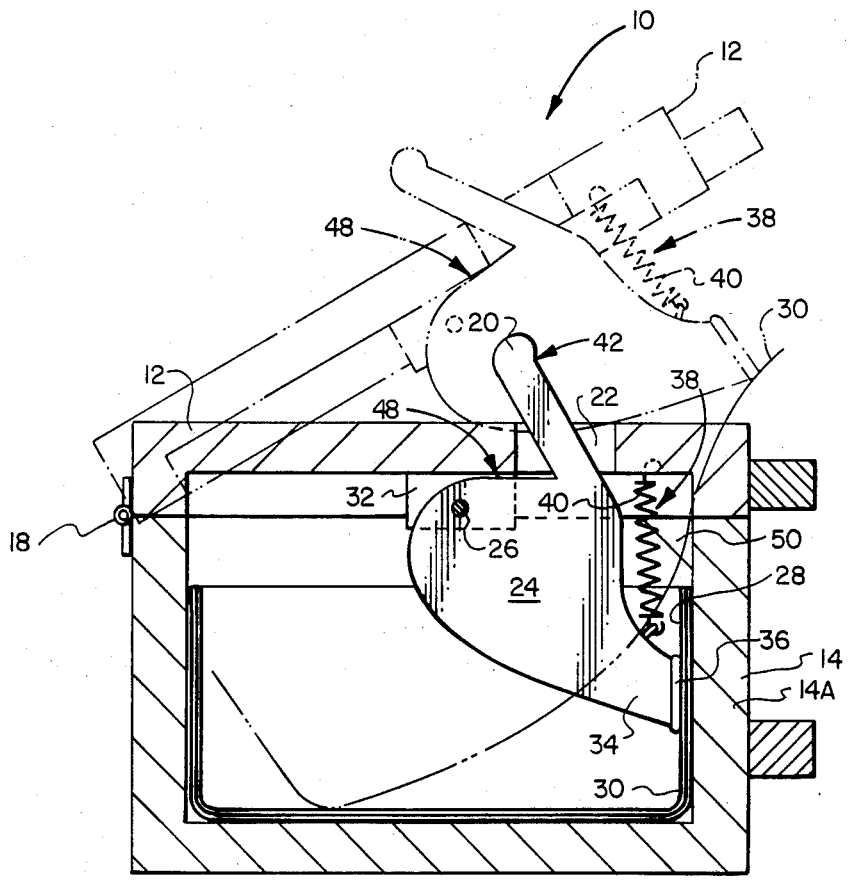
FIG. 2 is a cross sectional view of the coffee filter dispenser of FIG. 1 taken along line 2—2 in FIG.1.

Selected internal features of coffee filter dispenser 10 are illustrated in FIG. 1 with dotted outline. Interior features include plunger arm 24, a pivotal connection 26 by which plunger arm 24 is mounted to lid 12 and the positioning of a plurality of coffee filters 28 within container 14. The cross sectional side view of FIG. 2 illustrates the operation of coffee filter dispenser 10. In phantom or dotted line outline showing the raised lid and separated uppermost coffee filter 30.

FIG. 2 illustrates the placement of nested coffee filters 28 within container 14 adjacent wall 14A. In the preferred embodiment, wall 14A of the container is opposite the placement of hinge 18 which connects lid 12 to container 14. Plunger arm 24 is connected to lid 12 through pivotal connection 26 provided on a mounting block 32. The terminal end of plunger arm 24 provides a filter engaging projection 34 which, in the preferred embodiment, provides a rubber tip 36 for fictional engagement with uppermost coffee filter 30 of stack 28. A means 38 is provided for automatically urging the filter engaging projection of plunger arm 24 toward wall 14A of container 12. In the preferred embodiment means 38 are provided by a spring 40 connected between lid 2 and the plunger arm intermediate pivotal connection 26 and rubber tip 36. Spring 40 urges a rotation about pivot point 26 in a plane parallel to the rotation of lid 12 about hinge 18. A means 42 is provided for resetting the plunger arm to overcome the biasing effect of means 38 for automatically urging filtering engaging projection 34 toward wall 14A of container 14. This biasing must be overcome in order to allow replacement of plunger arm 24 within container 14A as lid 12 is closed.

In FIG. 2, means 42 for resetting plunger arm 24 is provided by reset actuator 20 which projects to the exterior of lid 12 and is connected to plunger arm 24 through aperture 22 in lid 12. In preferred embodiment, reset actuator 20 engages plunger arm 24 between pivotal connection 26 and filter engaging projection 34 and offset projection for moment arm 48.

Figure 3:
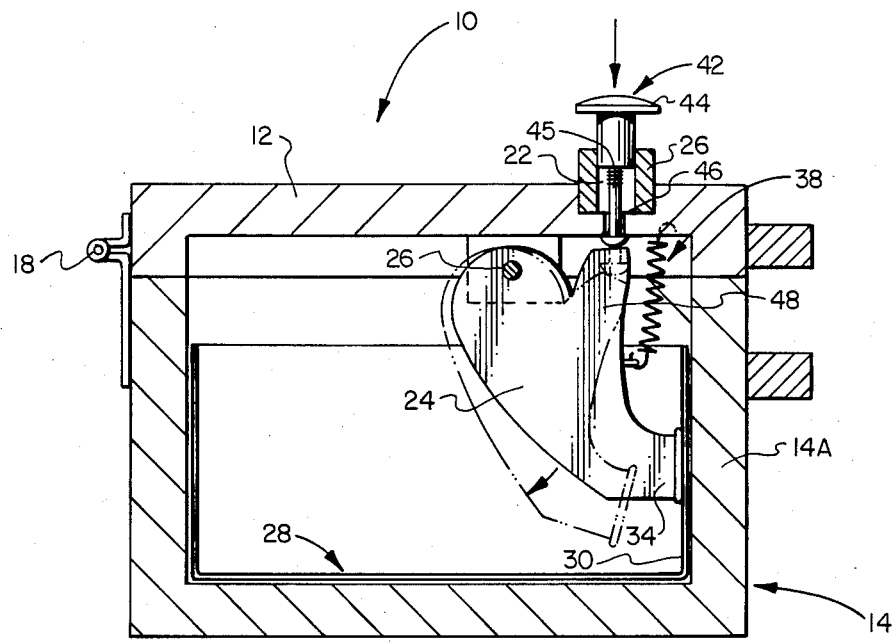
FIG. 3 is a cross sectional side view of an alternate embodiment of the coffee filter constructed in accordance with the present invention.

FIG. 3 illustrates another embodiment of a coffee filter dispenser of the present invention in which means 42 for resetting plunger arm 24 is provided by a button 44 slidable mounted through an aperture 22 through a sleeve 46 to project a push rod 45 for contact with a moment arm 48 projecting from plunger arm 24 intermediate pivotal connection 26 and filter engaging projection 34. The embodiment of FIG. 3 also employs a spring 40 for means 38 for automatically urging filter engaging projection 34 against upper most filter 30 in a stack of cupuliform coffee filters 28 within container 14.

FIG. 2 best illustrates the operation of the present invention in which lifting lid 12 pulls plunger arm 24 upward. Plunger arm 24 is engaged with upper most coffee filter 30 of the stack of coffee filters 28 such that uppermost coffee filter 30 is drawn upwards with plunger arm 24 as it is pressed against wall 14A by filter engaging projection 34. In the preferred embodiment, rubber tip 36 produces a friction engagement which carries uppermost coffee filter 30 with rubber tip 36 as the engaged coffee filter slides over other filters within stack 28. Means 38 for automatically urging filter engaging projection 34 toward wall 14A provides a tension and therefore, pressure in the frictional engagement of filter engaging projection 34 with uppermost coffee filter 30. This tension is maintained although pivoting lid 12 about hinge 18 requires that plunger arm 24 must yield to pivot about pivotal connection 26. Cleats 50 are mounted at the top of wall 14A and ensure that the remainder of stack 28 of coffee filters remains within the container as uppermost coffee filter 30 is pulled free. A separated coffee filter is thereby singularly dispensed and is ready for use.

Means 42 for resetting plunger arm 24 is operated so that lid 12 is closed after dispensing coffee filter 30 without interference of plunger arm 24 with top of wall 14A of container 14.

In FIG. 2, reset is accomplished by pushing down and forward reset actuator 20, thereby pivoting plunger arm 24 about pivotal connection 26 to withdraw filter engaging projection 34 to the position which will not interfere with the closing of lid 12 and which will ensure placement of filter engaging projection 34 within the center of nested cupuliform coffee filters 28. Release of reset actuator 20 then allows spring 40 to draw upper tip 36 carried on filter engaging projection 34 into firm contact with the next uppermost coffee filter 30. The coffee filter dispenser is then prepared to dispense another coffee filter upon the simple action of lifting lid 12.

In the embodiment of FIG. 3, means 42 for resetting plunger arm 24 is activated by pushing button 42. A phantom outline of plunger arm 24 in the reset position is illustrated in FIG. 3.

Although each of the present illustrations shows a coffee filter dispenser having a lid in a normally horizontal position, coffee filter dispenser 10 of the present invention is adaptable for vertical mounting in which hinge 18 is at the top and lid 12 depends vertically to cover container 14. Operation of coffee filter dispenser 10 in the vertical orientation has the added advantage that separated filters 30 are dispensed to fall free directly beneath the coffee filter dispenser and it is not even necessary to handle the coffee filter if coffee making equipment is positioned beneath the dispenser.

Other modifications, changes, and substitutions are intended in the foregoing disclosure and in some instances, some features of the invention will be employed without a corresponding use of other features. Accordingly, it is appropriate that the appending claims be construed broadly and in a manner consistent with the spirit and scope of the invention herein.

I claim:

1. An apparatus for singularly dispensing an uppermost cupuliform coffee filter from a stack of such coffee filters comprising:

a container having a plurality of walls which define an opening and which are disposed to receive the stack of cupuliform coffee filters with the planar bottom of said filters opposite the opening of the container and the stack of cupuliform coffee filters adjacent a first wall of said plurality of walls;

a lid hingedly connected to the container to selectively cover the opening;

a plunger arm pivotably connected to the underside of the lid and disposed to depend a filter engaging projection at the terminal end of the plunger arm in an arc of rotation lying in a plane which is substantially orthogonal to the first wall; said plunger arm further including:

an arcuate region between the pivotal connection to the lid and the filter engaging projection; and a moment arm which projects from the plunger arm intermediate of the pivotal connection and the filter engaging projection;

means for automatically urging the filter engaging projection toward the first wall such that the filter engaging projection contacts the uppermost coffee filter;

means for selectively resetting the plunger arm by withdrawing it from the first wall whereby the means for automatically urging the filter engaging projection is overcome and the filter engaging means retreats to a position permitting closure of the lid; said resetting means comprising:

a button;

a sleeve defining an aperture through the lid;

a push rod slidably mounted through the sleeve, a first end of the push rod connected to the button and accessible on the exterior end of the lid and a second end of the push rod presented to contact the moment arm of the plunger arm.

2. A coffee filter dispenser in accordance with claim 1 wherein the filter engaging projection is covered with rubber.

3. A coffee filter dispenser constructed in accordance with claim 1 wherein means for automatically urging the filter engaging projection toward the first wall is a spring connected between the lid and the plunger arm between the pivotal connection and the filter engaging projection.

4. A coffee filter dispenser constructed in accordance with claim 1 further comprising at least one cleat mounted to the first wall adjacent to the opening of the container and sloping inwardly toward the opening whereby the stack of coffee filters is retarded from progressing through the opening when the uppermost coffee filter is carried through.

* * * * *